(12) United States Patent
Sato et al.

(10) Patent No.: US 10,893,155 B2
(45) Date of Patent: Jan. 12, 2021

(54) NON-TRANSITORY COMPUTER-READABLE RECORDING MEDIUM CONTAINING INSTRUCTIONS CAUSING DEVICE TO DOWNLOAD DATA FROM SERVER

(71) Applicant: Brother Kogyo Kabushiki Kaisha, Nagoya (JP)

(72) Inventors: Hirotaka Sato, Nagoya (JP); Shintaro Kunimoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/745,964

(22) Filed: Jan. 17, 2020

(65) Prior Publication Data
US 2020/0153982 A1    May 14, 2020

Related U.S. Application Data

(63) Continuation of application No. 16/287,282, filed on Feb. 27, 2019, now Pat. No. 10,542,162.

(30) Foreign Application Priority Data

Mar. 2, 2018  (JP) .................................. 2018-037129

(51) Int. Cl.
*G06F 15/00* (2006.01)
*G06F 3/12* (2006.01)
(Continued)

(52) U.S. Cl.
CPC ..... *H04N 1/00344* (2013.01); *H04N 1/00244* (2013.01); *H04N 1/00384* (2013.01); *H04N 1/00938* (2013.01)

(58) Field of Classification Search
CPC .......... H04N 1/00344; H04N 1/00244; H04N 1/00384; H04N 1/00938
(Continued)

(56) References Cited

U.S. PATENT DOCUMENTS 6,967,675 B1    11/2005  Ito et al.
10,129,418 B2   11/2018  Kano et al.
(Continued)

FOREIGN PATENT DOCUMENTS

JP          2016-212731 A      12/2016

*Primary Examiner* — Douglas Q Tran
(74) *Attorney, Agent, or Firm* — Banner & Witcoff, Ltd.

(57) ABSTRACT

There is provided a non-transitory computer-readable recording medium for an information processing device provided with a first communication interface, a second communication interface and a controller. The recording medium contains instructions realizing an application program. When startup option including the address information is not delivered and when the address information is not stored, the control executes a standby process to await input of the address information through a user interface is executed. When the address information indicating a location of a storage server is input during the standby process, the controller downloads the content data from the storage server indicated by the input address information. When the address information included in the startup option has been stored in the memory, the controller downloads the content data from the storage server indicated by the address information store in the memory.

4 Claims, 8 Drawing Sheets

(51) Int. Cl.
*G06K 1/00* (2006.01)
*H04N 1/00* (2006.01)

(58) Field of Classification Search
USPC .................................................. 358/1.15, 1.1
See application file for complete search history.

(56) References Cited

U.S. PATENT DOCUMENTS

| | | | |
|---|---|---|---|
| 2008/0309673 A1 | 12/2008 | Kudo | |
| 2009/0100071 A1 | 4/2009 | Kobayashi et al. | |
| 2011/0312278 A1* | 12/2011 | Matsushita | G08C 17/02 |
| | | | 455/66.1 |
| 2013/0286425 A1* | 10/2013 | Nakamura | G06F 3/122 |
| | | | 358/1.13 |
| 2014/0063544 A1* | 3/2014 | Kadota | G06F 3/1205 |
| | | | 358/1.15 |
| 2016/0337534 A1 | 11/2016 | Kano et al. | |

\* cited by examiner

NON-TRANSITORY COMPUTER-READABLE RECORDING MEDIUM CONTAINING INSTRUCTIONS CAUSING DEVICE TO DOWNLOAD DATA FROM SERVER

CROSS-REFERENCE TO RELATED APPLICATIONS

This application is a continuation of prior U.S. application Ser. No. 16/287,282 filed on Feb. 27, 2019, which claims priority under 35 U.S.C. § 119 from Japanese Patent Application No. 2018-037129 filed on Mar. 2, 2018. The entire subject matter of the applications are incorporated herein by reference.

BACKGROUND

Technical Field

The present disclosures relate to a non-transitory computer-readable recording medium containing instructions causing a controller of a device to download data from a server.

Related Art

Conventionally, there is known an MFP implemented with a data processing application which causes the MFP to access a server and download necessary data therefrom.

SUMMARY

Generally, a program having a function of downloading data requires user operations to input a URL of a storage server from which data is downloaded and various settings therefor. Such user operations are relatively troublesome for the user. Further, for the user who is unfamiliar with such operations, the more the operations the user is required to perform, the more operation errors occur, which results in confusions of the user.

According to aspects of the present disclosures, there is provided a non-transitory computer-readable recording medium for an information processing device provided with a first communication interface, a second communication interface and a controller, the recording medium containing instructions realizing an application program. The instructions cause, when executed, the controller to perform a first communication process of downloading content data from a storage server through the first communication interface, a second communication process of transmitting the content data downloaded in the first communication process to a target device capable of outputting the content data through the second communication interface, a first determining process of determining whether a startup option including address information is delivered when the application program is started, a second determining process of determining whether the address information is stored in a memory of the image processing device, and in response to determining, in the first determining process, that the startup option including the address information is not delivered and in response to determining, in the second determining process, that the address information is not stored, a first standby process of displaying a first operation screen on a display of the information processing device and standing by input of the address information through a user interface of the image processing device. Further, in response to receipt of the address information indicating the storage server through the user interface during standby for input of the address information in the standby process, the instructions cause the controller to download the content data from the storage server indicated by the input address information. In response to determining, in the first determining process, that the startup option including the address information is delivered, the instructions cause the controller to not execute the first standby process, download, in the first communication process, the content data from the storage server indicated by the address information included in the startup option, and store the address information included in the startup option in the memory. Further, in response to determining, in the second determining process, that the address information is stored, the instructions cause the controller to not execute the first standby process, and download, in the second communication process, the content data from the storage server indicated by the address information stored in the memory.

DETAILED DESCRIPTION OF THE EMBODIMENT

Hereinafter, referring to the accompanying drawings, a printing system 1 according to an illustrative embodiment of the present disclosures will be described.

Figure 1:
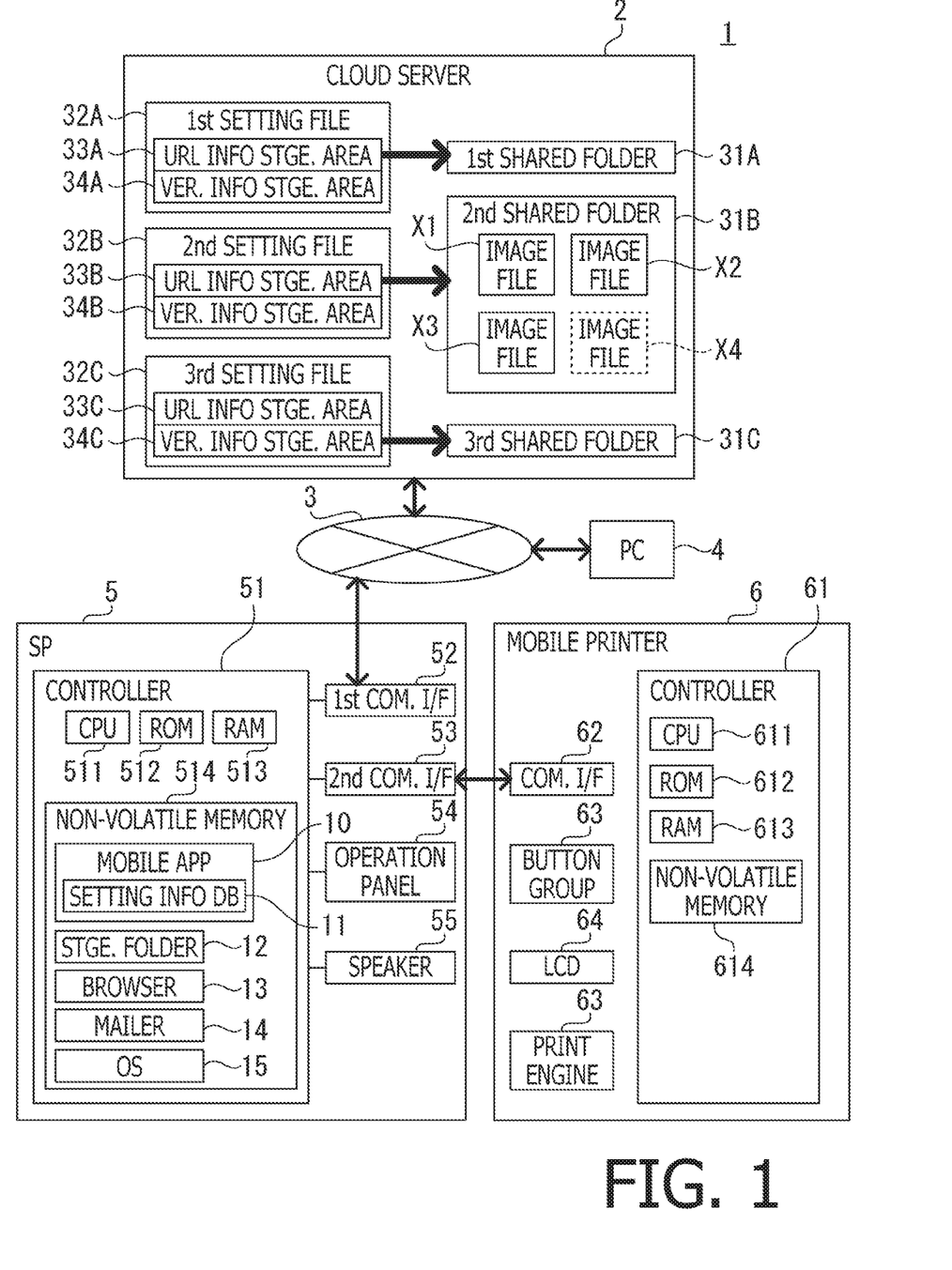
FIG. 1 shows a block diagram of a printing system according to an illustrative embodiment of the present disclosures.

As shown in FIG. 1, the printing system 1 according to the illustrative embodiment is configured such that a cloud server 2, a PC 4 and an SP (abbreviation of a smartphone) 5 are communicatably connected through the Internet 3. A mobile printer 6 is not directly connected to the Internet 3, but communicatably connected to terminal devices such as the SP 5. The cloud sever 2 is an example of a storage server. The SP 5 is an example of an information processing device. The mobile printer 6 is an example of a device.

It should be noted that the mobile printer 6 may also be connected to a PC and/or a mobile tablet in addition to the SP 5.

Figure 2:
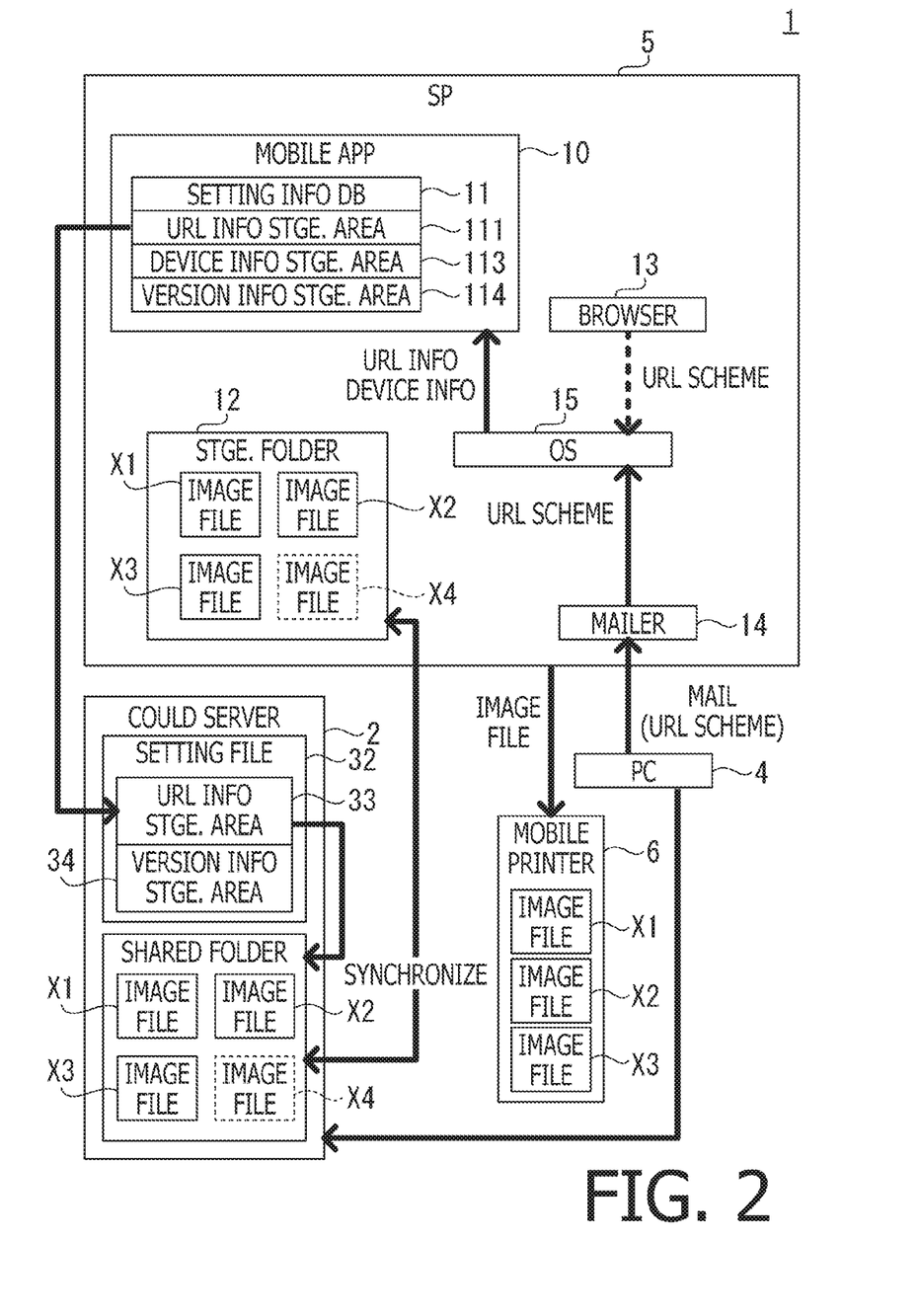
FIG. 2 shows a functional configuration of the printing system according to the illustrative embodiment.

As shown in FIG. 2, the cloud server 2 is an online storage configured to store files and folders, which are expected to be shared among users. Examples of the cloud servers 2 are DropBox®, Google Drive®, OneDrive® and iCloud®. Data stored in the cloud server 2 is integrally managed by, for example, an administrator through the PC 4. The cloud server 2 has shared folders 31 and setting files 32. According to the illustrative embodiment, anyone can access the shared folders 31 and the setting files 32 without authentication. However, only one who is authorized (e.g., the administrator) is allowed to add, modify and delete the data in the shared folder and/or contents of the setting files 32.

The shared folders 31 stores one or more image files X which are uploaded by the PC 4 through the Internet. In the following description, when it is necessary to differentiate multiple image files X from each other, the multiple image files X are respectively indicated as X1, X2, X3 . . . by adding suffixes 1, 2, 3 . . . . When it is not necessary to differentiate the multiple image files X from each other, the image files are generally indicated as the image file(s) X.

By managing the plurality of image files X with use of the shared folders 31, it is possible for a user to download multiple image files X at one time. It is noted that the image files X are examples of content data.

The shared folders 31 are provided corresponding to, for example, models of the mobile printer 6 and/or kinds of purposes of printing. Therefore, the cloud server 2 has a plurality of shared folders 31. Each of the plurality of shared folders 31 are assigned with intrinsic URL indicating an online location. In the following description, when it is necessary to differentiate the multiple shared folders 31 from each other, the multiple shared folders are indicated as 31A, 31B, 31C . . . by adding suffixes A, B, C . . . . When it is not necessary to differentiate the multiple shared folders 31 from each other, the shared folders are generally indicated as the shared folder(s) 31.

The setting files 32 (see FIG. 2) are files storing information regarding the shared folders 31, respectively. For each of the shared folders 31, a corresponding setting file 32 is associated. Each of the setting files 32 includes a URL information storage area 33 and a version information storage area 34. In the following description, when it is necessary to differentiate the multiple setting files 32 from each other, the multiple setting files are indicated as 32A, 32B, 32C . . . by adding suffixes A, B, C . . . . When it is not necessary to differentiate the multiple setting files 32 from each other, the setting files are generally indicated as the setting file(s) 32.

Each of the URL information storage areas 33 (see FIG. 2) stores URL information assigned to the corresponding shared folder 31 associated with the corresponding setting file 32. In the following description, when it is necessary to differentiate the plurality of URL information storage areas 33 from each other, the plurality of URL information storage areas are indicated as 33A, 33B, 33C . . . by adding suffixes A, B, C . . . . When it is not necessary to differentiate the plurality of URL information storage areas from each other, the URL information storage areas are generally indicated as the URL information storage area(s) 33.

Each of the version information storage areas 34 (see FIG. 2) stores version information of the corresponding shared folder 31 associated with the corresponding setting file 32. In the following description, when it is necessary to differentiate the plurality of version information storage areas 34 from each other, the plurality of version information storage areas are indicated as 34A, 34B, 34C . . . by adding suffixes A, B, C . . . . When it is not necessary to differentiate the plurality of version information storage areas from each other, the version information storage areas are generally indicated as the version information storage area(s) 34. The version information is an example of identifying information used to identify content data stored in respective folders 31. To each of the setting files 32, intrinsic URL information indicating an online location is assigned.

According to the cloud server 2 shown in FIG. 1 is provided with first through third shared folders 31A, 31B and 32B, and first through third setting files 32A, 32B and 32C respectively corresponding to the first through third shared folders 31A, 31B and 31C. To the first through third shared folders 31A, 31B and 31C, different pieces of URL information are assigned. For example, the second setting file 32B is associated with the second shared folder 31B as the URL information of the second shared folder 31B is stored in the URL information storage area 33B. In the second shared folder 31B, for example, the image files X1-X3 are stored. Then, with use of the URL information regarding the second setting file 32B, it is possible to access all the image files X1-X3 stored in the second shared folder 31B at a time. Similarly, the first and the third setting files 32A and 32C are associated with the first and third shared folders 31A and 33C, respectively.

When, for example, the image file X4 is additionally stored in the second folder 31B, one of the image files X1-X3 is deleted, or the content of one of the image files X1-X3 is changed, the version information stored in the version information storage area 34B is updated. For example, the version "ver. 1" represented by the version information before the image file X4 is added and changed to, for example, "ver. 2" as the image file X4 is added. Therefore, for example, the SP 5 which uses the cloud server 2 can determine whether or not the image files X have been changed by checking the version information of the version information storage area 34B, without individually accessing the image files X stored in the second shared folder 31B. It is noted that rewriting the version information storage area 34B may be manually performed by the administrator through the PC 4, or automatically performed when the image file X is added.

The SP 5 is provided with a controller 51 which includes a CPU 511, a ROM 512, a RAM 513 and a non-volatile memory 514. The SP 5 is further provided with a first communication I/F 52, a second communication I/F 53, an operation panel 54 and a speaker 55, which are electrically connected to the controller 51.

The ROM 512 stores programs including a boot program to boot the SP 5. The RAM 513 is used as a work area and as a data storage area for temporarily storing data when various processes are executed. The non-volatile memory 514 is, for example, an HDD or a flash memory, which is used as an area storing program and data.

The CPU 511 performs various processes in accordance with programs retrieved from the ROM 511 and/or the non-volatile memory 514, or in accordance with user's instructions. It is noted that the controller 51 shown in FIG. 1 is a collective name including hardware and software used for controlling the SP 5, and does not necessarily represent a single hardware existing in the SP 5. The CPU 511 is an example of a computer. It is noted that the controller 51 could be an example of a computer.

The operation panel 54 is, for example, a touch panel, which receives user's input and displays images indicative of information. Hereinafter, an image indicating information will also be referred to as information. The speaker 55 is configured to output sound. The operation panel 54 is an example of a user interface as well as an example of a display.

The first communication I/F 52 includes hardware configured to communicate with an external device connected through a network. For example, the first communication I/F is configured to communicate with the cloud server 2 through the Internet 3. It is noted that the communication method employed in the first communication I/F 52 can be one in accordance with any standard (e.g. a LAN), and can be a wired one or a wireless one.

The second communication I/F 53 includes hardware configured to directly communicate with an external device.

For example, the second communication I/F 53 includes hardware configured to communicate with the mobile printer 6. The communication method employed by the second communication I/F 53 can be any standard (e.g., USB, Wi-Fi®, Bluetooth®, etc.), and can be wired or wireless. According to the illustrative embodiment, the first communication I/F 52 and the second communication I/F 53 are provided separately. However, the first communication I/F 52 and the second communication I/F 53 may be configured by a single communication I/F.

The SP 5 according to the illustrative embodiment is provided with a mobile application (hereinafter, referred to as a mobile app) 10, a browser 13, a mailer 14 and an OS 15, which are stored in a non-volatile memory 14. Further, the SP 5 is configured such that a storage folder 12 is provided to the non-volatile memory 14. The non-volatile memory 14 is an example of a memory.

The mobile app 10 is configured to download image files X from the cloud server 2 and transmit the downloaded image files to the mobile printer 6. The mobile app 10 is configured such that input of information necessary for downloading the image files X can be omitted when a particular condition is satisfied. The mobile app 10 is an example of an application program. The browser 13 and the mailer 14 are conventionally known ones, respectively.

As shown in FIG. 2, the browser 13 may display a web page which is published by the administrator through the PC 4 and the URL information is indicated therein. Further, the mailer 14 may receive an email message in which the URL information is indicated, and which e-mail message may be transmitted to the user by the administrator through the PC 4. The browser 13 may deliver the URL information to the OS 15 when an operation (e.g., a tapping) with respect to the URL information is received through the operation panel 54. So is the mailer 14. When receiving the URL information instructing startup of the mobile app 10, the OS 15 may start up the mobile app 10. The OS 15 may deliver a query included in the URL information to the mobile app 10 as a startup option.

In the non-volatile memory 514, there exists a setting information DB (DB being an abbreviation of a database) area as a storage area mainly used by the mobile app 10. In the following description, a state where there is a storage area mainly used by the mobile app 10 will also be referred to that a storage area of the mobile app 10 or a storage area provided to the mobile app 10. The setting information DB 11 includes a URL information storage area 111, a device information storage area 113 and a version information storage area 114.

The URL information storage area 111 is for storing URL information of the setting file 32 which is obtained by the mobile app 10. The device information storage area 113 is for storing device information regarding a selected device. The device information includes, for example, a model name of the device. The version information storing area 114 is for storing version information of the shared folders 31 obtained by the mobile app 10, that is, the version information of the image files X.

As shown in FIG. 1, the mobile printer 6 is for printing out image data on a recording medium. The mobile printer 6 is provided with a controller 61 including a CPU 611, a ROM 612, a RAM 613 and a non-volatile memory 614. The mobile printer 6 is further provided with a communication I/F 62, a button group 63, an LCD 64 and a print engine 65, which are electrically connected to the controller 61.

The ROM 612 stores programs including one for printing. The RAM 613 is used as a work area or a storage area for temporarily storing data when various processes are performed. The non-volatile memory 614 is, for example, an HDD or flash memory, and stores various programs and data. The image files X (e.g., the template) received from the SP 5 are stored in the non-volatile memory 614.

The CPU 611 executes various processes in accordance with programs retrieved from the ROM 612 or the non-volatile memory 614, or in accordance with the user's instructions. It is noted that the controller 61 indicated in FIG. 1 is a collective name including hardware and software used for controlling the mobile printer 6, and does not necessarily be a single hardware existing in the mobile printer 6.

The user input is made through the button group 63. The LCD 64 displays information. The communication I/F 62 includes hardware for communicating with the SP 5.

Hereinafter, referring to FIGS. 2-7, an operation of the printing system 1 will be generally described. Processes and each step of flowcharts described below are basically executed by the CPU 11 in accordance with instructions described in the programs such as the mobile app 10. In the description on the processes and flowchart below, processes to "determine", "extract", "select", "decide", "obtain", "receive", "control" and the like are those executed by the CPU 511. Further, the processes by the CPU 511 include controlling of hardware using the OS 15 of the SP 5. It is noted that the term "obtain" is used to include a condition where no request is made to obtain. That is, a process that the CPU 511 receives data without making a request therefor is included in a concept that "the CPU 511 obtains data".

In the following description, operations according to the respective programs will be described with occasionally omitting the description of the OS 15. That is, in the following description, an expression such as "a program P controls hardware H" may mean "a program P controls hardware H with use of OS 15".

In the specification, "data" is indicated by a bit string which is readable by a computer. Two or more pieces of data which represent substantially the same contents but have different formats will be regarded as the same data. So is the word "information". Regarding processes to be executed by a user, a process executed by the CPU 511 in accordance with instructions described in programs may be expressed with omitting the terms. For example, expressions such as "to be executed by the CPU 511", "the mobile app 10 executes . . . ".

The printing system 1 shown in FIG. 2 is used, for example, to print out documents and labels at a work site of a construction site or a product making factory. The mobile printer 6 is lent to each worker so that the worker can create (i.e., print out) documents or labels anytime and anyplace in the work site. For example, the mobile printers 6 may be lent to dozens through hundreds of workers. In such a case, the dozens through hundreds of mobile printers 6 may be of the same model or different models.

Each of the mobile printers 6 stores image files X of templates for the documents and labels so that the worker can print out the document or label easily at the work site. The mobile printer 6 cannot be connected to the cloud server 2. Therefore, according to the illustrative embodiment, the SP 5 downloads the image files X of templates from the cloud server 2, and transfers the thus downloaded image files X to the mobile printer 6. In the following description, it is explained that the SP 5 transfers the image files X downloaded from the cloud server 2 to the mobile printer 6 as they are. However, such a configuration may be modified such that, in the SP 5, the downloaded image files X may be modified by, for example, writing necessary information in the templates, and the modified image files X may be transferred to the mobile printer 6.

According to the illustrative embodiment, the administrator of the printing system 6 has stored, for example, image files X1-X3 related to an item Z2 in a second shared folder 31B using the PC 4. Similarly, the administrator has stored, for example, content data related to an item Z1 in a first shared folder 31A, and content data related to an item Z3 in a first shared folder 31C.

Therefore, any of the workers can make the SP 5 connect to the cloud server 2 to download latest version of the image files X, which are provided by the administrator, from the cloud server 2 to the SP 5, and transmit the downloaded image files X to the mobile printer 6. Accordingly, it is possible that documents and labels communalized in accordance with work contents or items can be printed.

Next, referring to the accompanying drawings, a process of downloading the content data will be described. The CPU 511 of the SP 5 executes the process shown in FIGS. 8A and 8B in response to startup of the mobile app 10.

It is noted that the sex, age, knowledge of IT (abbreviation of information technology) matters, life circumstances of the workers are of a wide variety. Therefore, among the workers who are supposed to use the mobile printer 6, there may be ones who are not familiar with usage of a network or operation of the SP 5. Further, in view of efficiency, it is preferable to reduce time and effort necessary for downloading the content data. As was explained with reference to FIG. 2, according to the illustrative embodiment, simply by inputting the URL information provided by the administrator, the worker can start up the mobile app 10.

Figure 7:
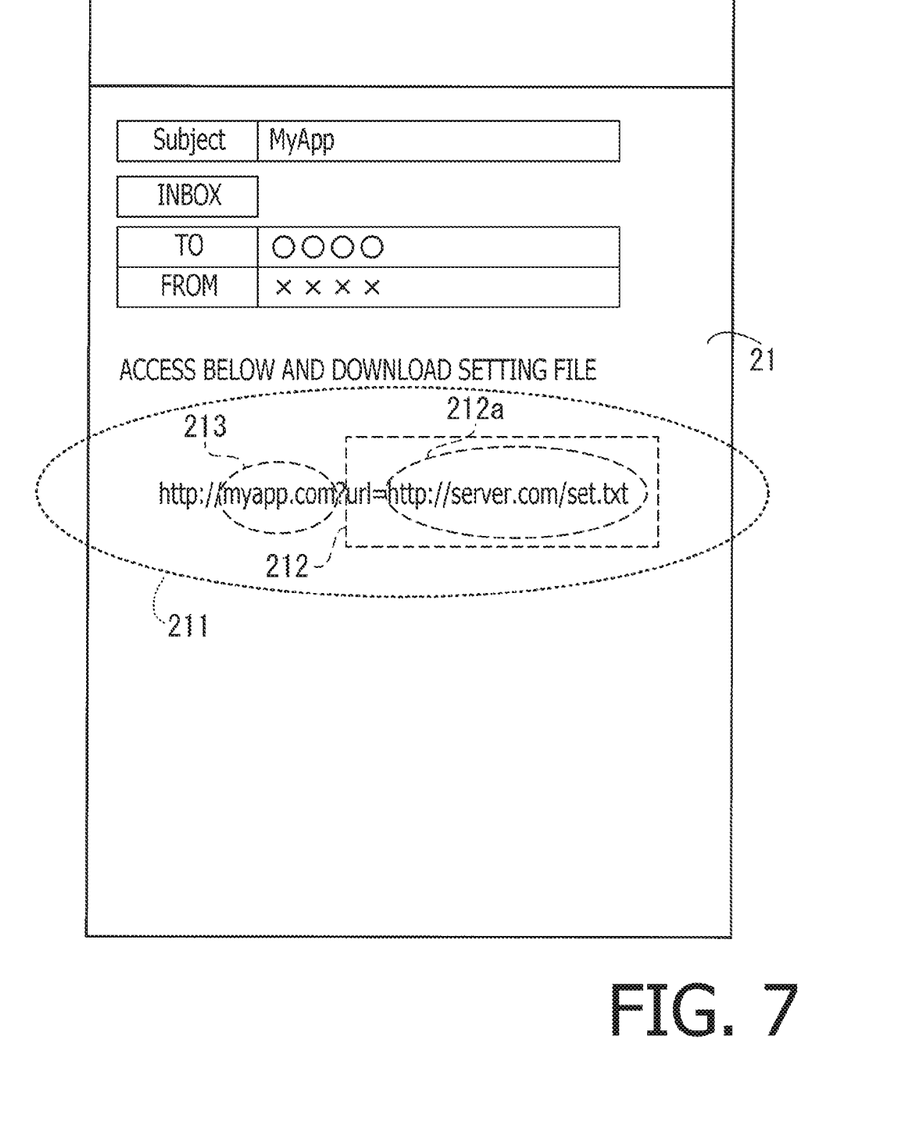
FIG. 7 shows an example of a URL scheme.

FIG. 7 show an example of a mail 21 displayed by the mailer 14. Among the URL schemes 211, a character string "myapp.com" after a character string "http://" indicates a command 213 instructing startup of the mobile app 10. A character string after a symbol "?" is a query 212. Further, a character string after "url=" is URL information 212a indicating the setting file 32. The query 212 is an example of the startup option. The URL information 212a is an example of the address information. It is noted that the URL information 212a is explained as an example of the address information according to the illustrative embodiment. However, an IP address of the setting file 32 of the cloud sever 2 may be regarded as an example of the address information.

The URL scheme 211 is embedded in e-mail messages the administrator transmits to the workers in the form of a text. Therefore, the administrator can notify the same URL scheme 211 to a plurality of workers with only one transmission operation. Alternatively or optionally, the administrator may publish a webpage including the URL scheme 211 to notify the URL scheme 211 to the workers. When the mobile app 10 is started with use of the URL scheme 211, the OS 15 delivers the query 212 to the mobile app 10. Then, the mobile app 10 obtains the URL information 212a (which will be described later) and downloads the content data. Accordingly, it is unnecessary for the workers to manually input various pieces of information to download the content data.

The mobile app 10 stores the information included in the query 212 in the non-volatile memory 514, and reuses the same. Accordingly, at next startup of the mobile app 10, it is not necessary for the worker to manually input the various pieces of information to download the content data.

Figure 3:
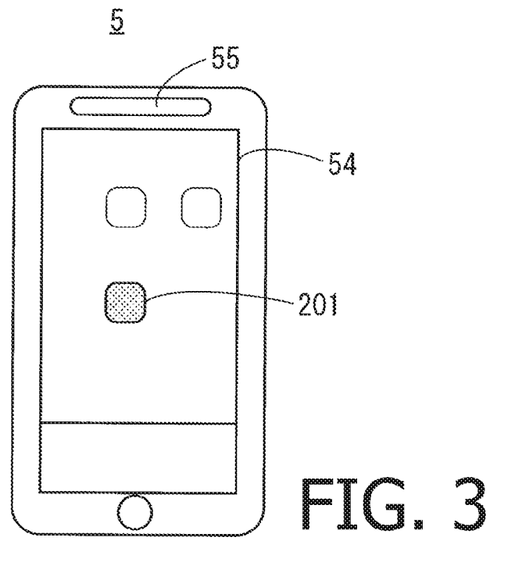
FIG. 3 is an example of an icon displaying screen.
Figure 8A:
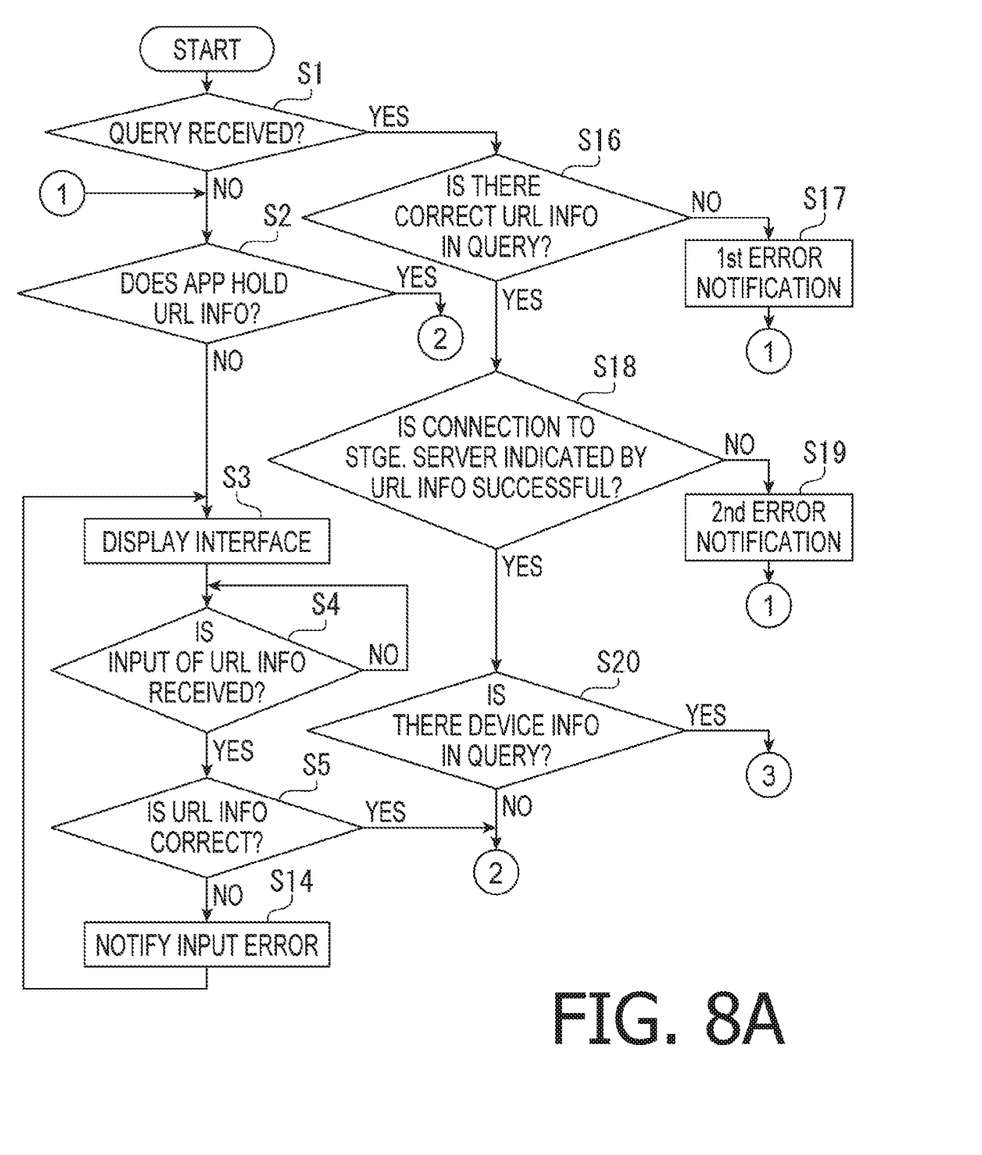
FIGS. 8A and 8B show a flowchart illustrating a transferring process.
Figure 8B:
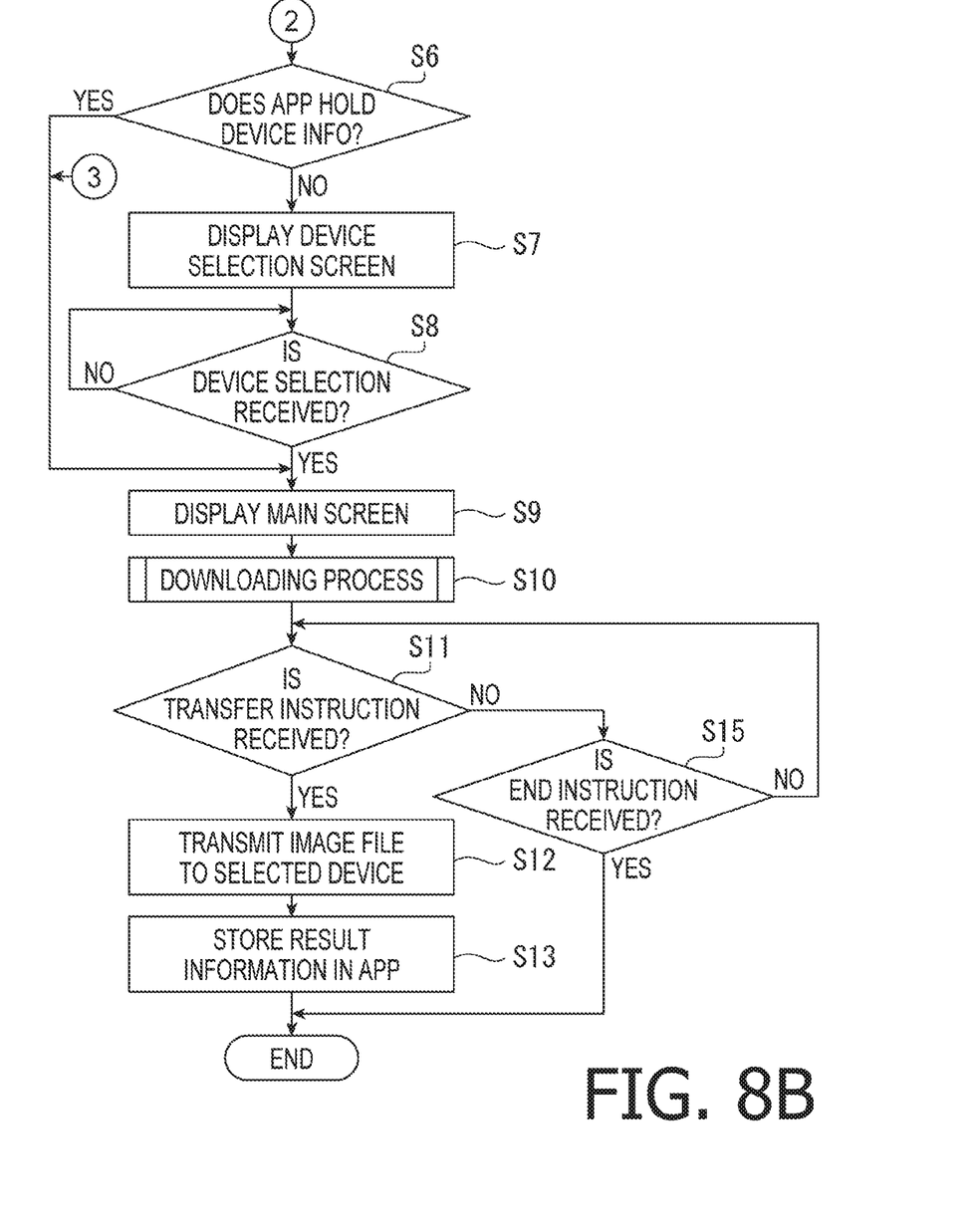

The CPU 511 determines whether the query 212 is obtained (S1). Step S1 is an example of a first determining process. When the mobile app 10 is started as a startup icon 210 shown in FIG. 3 is tapped, the CPU 511 does not obtain the query 212 (S1: NO). In such a case, as shown in FIGS. 8A and 8B, the CPU 511 determines whether the mobile app 10 holds the URL information in the URL information storage area 111 (S2). Step S2 is an example of a second determining process.

For example, when the startup icon 201 (see FIG. 3) is firstly tapped after the mobile app 10 is installed to the SP 5, the URL information is not stored in the URL information storage area 111 of the mobile app 10. When the URL information is not stored in the URL information storage area 111 of the mobile app 10 (S2: NO), the CPU 511 displays an initial screen 22 on the operation panel 54. On the initial screen, an input instruction button (not shown) is displayed.

Figure 4:
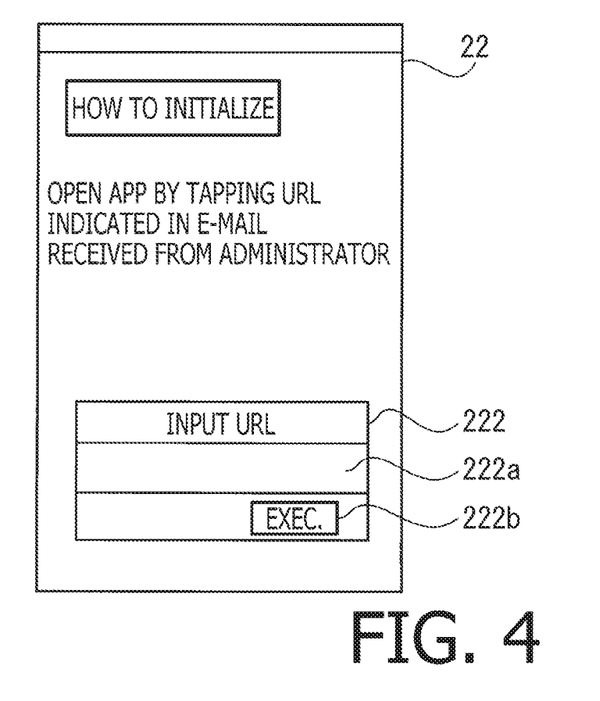
FIG. 4 is an example of an operation screen.

When the input instruction button (not shown) is taped, the CPU 511 displays, as shown in FIG. 4, the interface 222 on the operation panel 54 with being synthesized with the initial screen 22 (S3). It is noted that the initial screen 22 is an example of a first operation screen, and the interface 222 is an example of an input screen.

Thereafter, as shown in FIGS. 8A and 8B, the CPU 511 determines whether input of the URL information is received (S4). The CPU 511 awaits until the URL information is input in a URL input field 222a of the interface 222 shown in FIG. 4 and an execution button 222b is tapped (S4: NO). A process of steps S3 and S4 is an example of a first standby process.

When the URL information is input in the URL input field 222a of the interface 222 shown in FIG. 4 and the execution button 222b is tapped, the CPU 511 determines that the input of the URL information is received (S4: YES). Next, the CPU 511 determines whether the URL information is correct (S5). Concretely, the CPU 511 determines, in accordance with a method used in S16 (described later), whether the URL information is input in a correct format and determines, in accordance with a method used in S18 (described later), whether the CPU 511 has been connected to the cloud server 2 using the URL information.

When the input URL information is not correct (S5: NO), the CPU 511 notifies occurrence of an input error (S14). When it is determined that the URL information is correct (S5: YES), the CPU 511 determines whether the mobile app 10 holds the device information (S6). That is, the CPU 511 determines whether the device information is stored in the device information storage area 113 of the mobile app 10.

When the device information is not stored in the device information storage area 113 of the mobile app 10, the CPU 511 determines that the mobile app 10 does not store the device information (S6: NO). For example, when the mobile app 10 is started first time after the mobile app 10 is installed, the device information is not stored in the device information storage area 113. In such a case, the CPU 511 displays a device selection screen 23 on the operation panel 54 (S7). That is, the CPU 511 performs a device search using the second I/F 53 and displays search results on the device selection screen 23. The device selection screen 23 is an example of the second operation screen.

Figure 5:
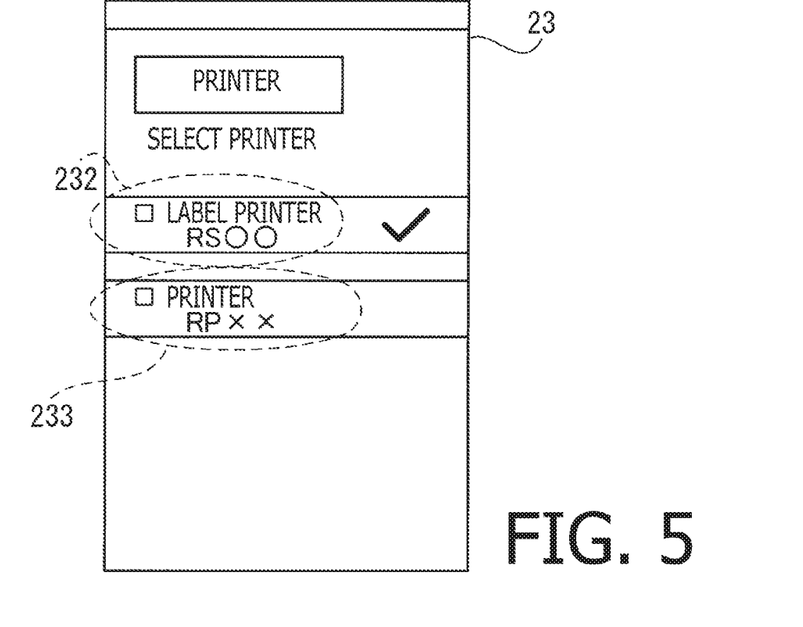
FIG. 5 is an example of a device selection screen.

Thereafter, as shown in FIGS. 8A and 8B, the CPU 511 determines whether a device selection has been made (S8). Steps S7 and S8 are an example of a second standby process. As shown in FIG. 5, on the device selection screen 23, the device information 232 and 233 on searched devices are displayed. When none of the device information 232 and 233 is tapped and no device is elected, the CPU 511 keeps displaying the device selection screen 23 on the operation panel 54 and maintains a standby state (S8: NO).

When one of the device information 232, 233 is tapped, the CPU 511 determines that selection of the device is received as shown in FIG. 8B (S8: YES). Then, the CPU 511 stores device information for identifying a selected device (hereinafter, also referred to as the selection device) in the non-volatile memory 514. Then, the CPU 511 displays the main screen on the operation panel 54 (S9). Thereafter, the CPU 511 executes the downloading process (S10). A process of step S10 is an example of a first communication process. That is, the CPU 15 connects to the cloud server 2 using the manually input URL information, downloads the image files X in the shared folders 31 and stores the same in the storage folder 12. The downloading process will be described later. It is noted that, when the downloading process is being executed, the CPU 511 synthesizes an indication notifying that downloading is in progress with the main screen and displays the same on the operation panel 54.

Figure 6:
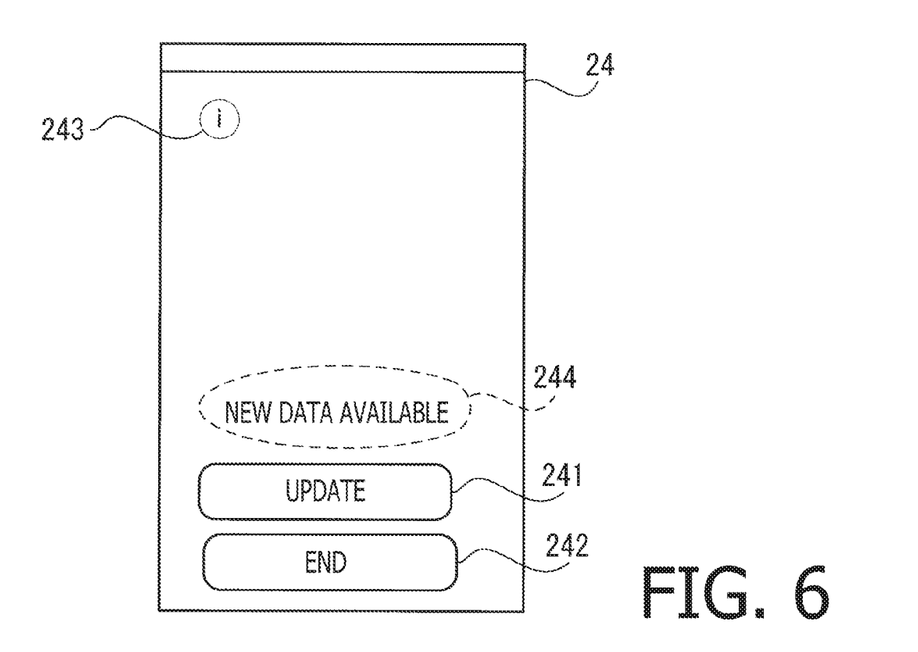
FIG. 6 is an example of a main screen.

When the downloading process is finished, the CPU 511 determines whether a transfer instruction is received (S11). For example, when the image files X are downloaded, the CPU 511 synthesizes a text 244 indicating that there exists new content data, an update instruction button 241 and an end button 242 with the main screen 24, and displays the same on the operation panel 54 as shown in FIG. 6.

When the update instruction button 241 is not tapped but the end button 242 is tapped (S11: NO, S15: YES), the CPU 511 terminates the process without transmitting the image files X to the selected device. When neither of the update instruction button 241 nor the end button 242 is tapped (S11: NO, S15: NO), the CPU 511 returns to S11, and stands by with keeping the main screen 24 (see FIG. 6) displayed on the operation panel 54.

On the other hand, when the update instruction button 241 is tapped, the CPU 511 determines that the transfer instruction is received (S11: YES) as shown in FIG. 8B. In this case, the CPU 511 transmits the image files X to the selected device (S12). It is noted that the selected device is a device which was selected in S8 of FIG. 8B. A process of step S12 is an example of the second communication process. That is, when the mobile printer 6 is the selected device, the CPU 511 is connected to the selected device through the second communication I/F 53, and transmits the image files X1, X2 and X3 stored in the storage folder 12. The mobile printer 6 stores the thus received image files X1, X2 and X3 in the non-volatile memory 614.

Thereafter, the CPU 511 stores result information, which indicates a result that the image files X have been transmitted to the selected device (i.e., the mobile printer 6), in the device information storage area 113 of the mobile app 10 (S13), and terminates the process.

Next, a case where the CPU 511 determines that the query 212 is received (S1: YES) will be described. The CPU 511 determines whether the query 212 includes the correct URL information (S16). A process of steps S16 is an example of a fourth determining process. For example, the CPU 511 determines that the correct URL information is not included in the query 212 (S16: NO) when a text string "url=" which implies that the URL information is described is not included in the URL scheme 211 as shown in FIG. 7. Further, the CPU 511 determines that the correct URL information is not included in the query 212 (S16: NO) when a text following the text string "url=" does not have a correct format as the URL information. When the CPU 511 determines that query 212 does not include the correct URL information, the CPU 511 issues a first error notification (S17) as shown in FIG. 8A. A process of step S17 is an example of a first error notification.

When the first error notification is issued, the CPU 511 synthesizes a message such as "Downloading cannot be started.", "Format of URL information is incorrect. Contact the administrator." or the like with the main screen 24, and displays the main screen 24 with the synthesized message on the operation panel 54. As the worker notifies the administrator of the error of the format of the URL information, it becomes possible to encourage the administrator to correct the URL scheme 211, embed the same in an e-mail message and re-transmit the e-mail message to the SP 5 of each of the workers. According to such a configuration, the URL information having a wrong format can be corrected at an early stage, thereby cutting out the need of troublesome operations of the worker.

After notifying the first error, the CPU 511 executes steps S2 onwards. That is, when the URL information is not stored in the URL information storage area 111 of the mobile app 10 (S2: NO), the CPU 511 asks the user to manually input the URL information through the interface 222. The processes after S2 have already been described above, and will not be repeated for brevity.

When, for example, the query 212 includes a text having a character string "url=" and the query 212 has a correct format as shown in FIG. 7, the CPU 511 determines that the query 212 includes the correct URL information (S16: YES) as shown in FIG. 8A. In this case, the CPU 511 proceeds to S18 and determines whether the cloud server 2 indicated by the URL information 212a included in the query 212 is accessible.

When the connection is failed (S18: NO), the CPU 511 issues a second error notification (S19). A process of step S19 is an example of a second error notification. When the connection is failed, the CPU 511 may display messages indicating causes and/or coping methods regarding the error on the display panel 54 or output voice messages through the speaker 55. Examples of the messages to be displayed or audibly output may be "Connection with Storage Server is Failed", "Please Retry to Download in Better Communication Circumstance", "Contact Administrator When Downloading is Failed even in Good Communication Circumstance" or the like. The concrete method of such notifications is similar to that executed in S17, and description thereof is omitted accordingly. According to the above configuration, it is possible to encourage the user to retry to download the image files X at a different place and/or a different time.

As described above, the CPU 511 distinguishably executes the notification of the first error (S17) and the notification of the second error (S19). Accordingly, the user can cope with respective errors appropriately.

When the connection is successfully made (S18: YES), the CPU 511 determines whether the device information is included in the query 212 (S20). A process in S20 is an example of a third determining process. When the device information is included in the query 212 (S20: YES), the CPU 511 proceeds to S9. That is, the CPU 511 displays the main screen 24 without displaying the device selection screen 23 shown in FIG. 5. Then, the CPU 511 connects to the cloud server 2 with use of the URL information 212a included in the query 212, and downloads the image files X stored in the shared folder 31. Since the process after the download has been done are described above, description thereof will be repeated here. According to the above configuration, the worker can start downloading without inputting the URL information or selecting the device.

When the device information is not included in the query 212 (S20: NO), the CPU 511 executes the processes of S6 onwards. When the query 212 includes the URL information 212a with which the CPU 511 is connectable to the cloud server 2 (S16: YES, S18: YES), but the query 212 does not include the device information (S20: NO) and the mobile app 10 does not hold the device information (S6: NO), the CPU 511 omits displaying the initial screen 22 and the interface 222 which are shown in FIG. 4, but displays the device selection screen 23 (see FIG. 5) to encourage the user to select the device. That is, the CPU 511 starts downloading the image files X in the shared folder 31 after the device is selected. Therefore, the worker can start downloading simply by selecting the device, without inputting the URL information.

In contrast, when the query 212 includes the URL information 212a connectable to the cloud server 2 (S16: YES, S18: YES), the query 212 does not include the device information (S20: NO), and the mobile app 10 holds the device information (S6: YES), the CPU 511 starts downloading without displaying the initial screen 22 (see FIG. 4) or the device selection screen 23 (see FIG. 5). For example, at a time of the second or later startup of the mobile app 10, the device information has been stored in the mobile app 10. In such a case, the CPU 511 starts downloading without awaiting input of the URL information or selection of the device. The process of downloading is the same as above, and description thereof will be omitted.

As shown in FIGS. 8A and 8B, when the query 212 is not received (S1: NO) and the mobile app 10 holds the input information of the URL information (S2: YES), the CPU 511 proceeds to S6 and starts downloading the image files X without displaying the initial screen as shown in FIG. 4. For example, considering a case where the mobile app 10 is started as the startup icon 201 is tapped 2nd time or later. In such a case, the URL information has been stored in the mobile app 10 when it was executed previous time (see FIG. 9). In such a case, the CPU 511 proceeds to S6 to determine whether the mobile app 10 holds the device information without awaiting input of the URL information. Therefore, when the mobile app 10 is started as the startup icon 201 is tapped second time or later, the CPU 511 can start downloading without awaiting input of the URL information or selection of the device.

Figure 9:
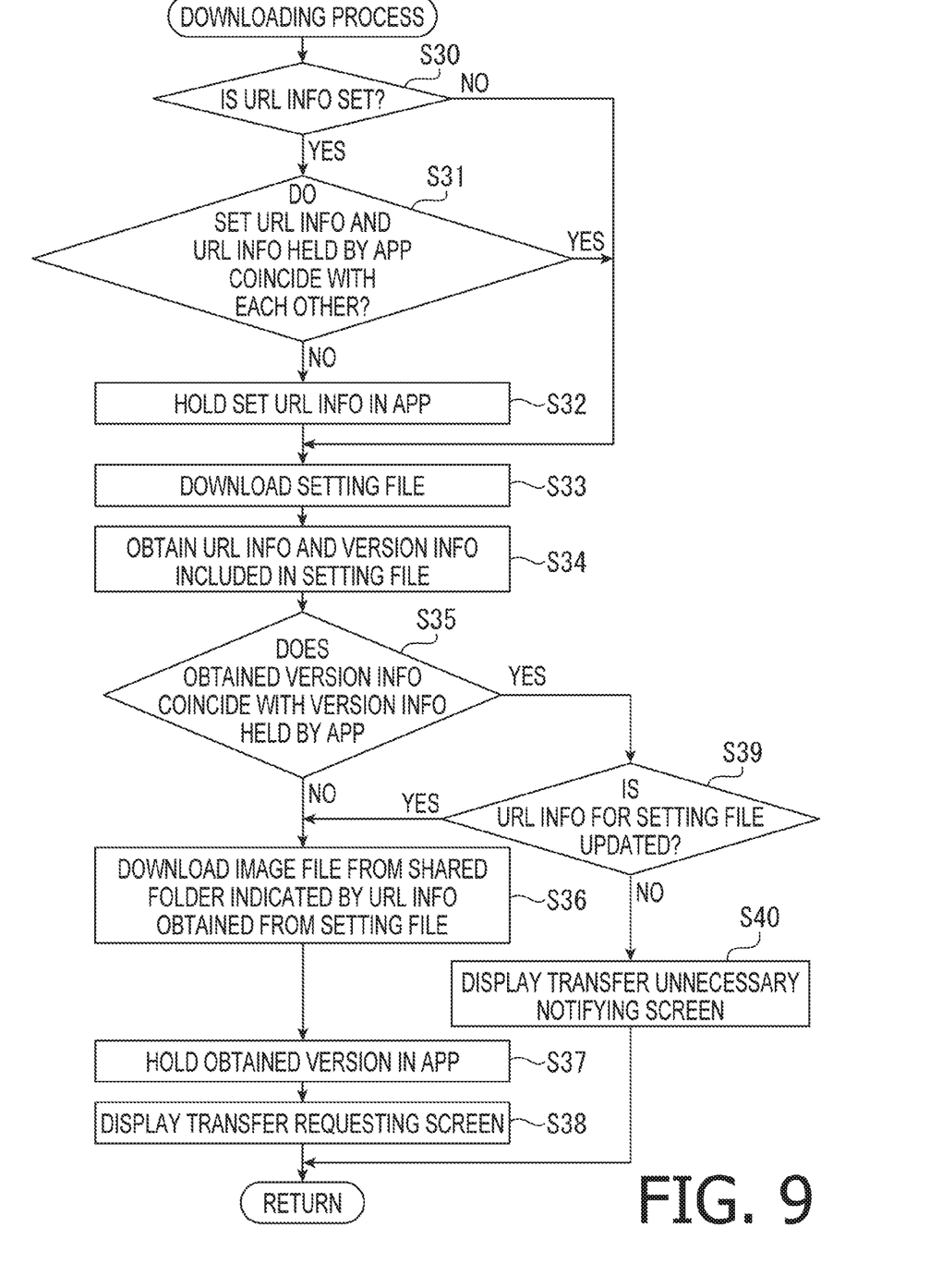
FIG. 9 shows a flowchart illustrating a downloading process.

Hereinafter, referring to FIG. 9, the downloading process will be described in detail.

When the downloading process is started, the CPU 511 determines whether the URL information is set (S30). It is noted that the CPU 511 temporarily stores the URL information received through the interface 222 in S4 (FIG. 8A) or the URL information 212a included in the query 212 received in S1 (FIG. 8A) in the RAM 513. Thus, when the URL information, which is obtained in S4 or S1, is temporarily stored in the RAM 513, the CPU 511 determines that the URL information is set.

When it is determined that the URL information is set (S30: YES), the CPU 511 determines whether the URL information temporarily stored in the RAM 513 and the URL information the mobile app 10 holds coincide with each other (S31). For example, when the mobile app 10 is firstly started and the URL information is not stored in the URL information storage area 111, the CPU determines that the URL information as set and the URL information the mobile app 10 holds do not coincide with each other. In a case where the URL information is stored in the URL information storage area 111 of the mobile app 10, when the URL information input to the interface 222 or the URL information 212a included in the query 212 does not coincide with the URL information held by the mobile app 10, the CPU 511 determines that the set URL information and the URL information the mobile app 10 holds do not coincide with each other.

When it is determined that the set URL information and the URL information the mobile app 10 holds do not coincide with each other (S31: NO), the CPU 511 stores the set URL information in the URL information storage area 111 of the mobile app 10 (S32), and proceeds to S33. That is, the CPU 511 makes mobile app 10 to hold the latest URL information.

When it is determined that the set URL information and the URL information the mobile app 10 holds coincide with each other (S31: YES), the CPU 511 proceeds to S33 without executing S32. That is, the CPU 511 does not update the URL information when the set URL information and the URL information the mobile app 10 holds coincide with each other.

Thereafter, with use of the URL information the mobile app 10 holds, the CPU 511 connects to the setting file 32 of the cloud server 2 and downloads the setting files 32 (S33). A process of S33 is an example of a third communication process. Then, the CPU 511 obtains the URL information and the version information of the shared folder 31 stored in the setting files 32 (S34).

Then, the CPU 511 determines whether the version information obtained in S34 coincides with the version information stored in the version information storage area 114 (S35). A process in S35 is an example of a determining process. For example, when the mobile app 10 is firstly executed after installation, the version information is not stored in the version information storage area 114. In such a case, the CPU 511 determines that the version information obtained in S34 does not coincide with the version information stored in the version information storage area 114. When, for example, the administrator adds an image file X to the shared folder 31 which stores the image files X1-X3 after the mobile app 10 was previously executed, the version information stored in the version information storage area 34 of the setting file 32 has been changed. In such a case, the CPU 511 determines that the version information held by the mobile app 10 and the version information obtained from the setting file 32 do not coincide with each other.

When it is determined that the version information obtained in S34 does not coincide with the version information stored in the version information storage area 114 (S35: NO), the CPU 511 downloads, in S36, the image files X from the shared folder 31 indicated by the URL information obtained in S34. A process of S36 is an example of a fourth communication process. The URL information obtained from the setting file 32 is for identifying the shared folder 31, the CPU 511 can download the image files X in the shared folder 31 even if the identifying information of each of the image files X. That is, the worker can operate the SP 5 to download a plurality of image files X without troublesome operations to input identifying information of each of the plurality of image files X.

Then, in S37, the CPU 511 makes the mobile app 10 hold the version information obtained in S34. A process in S37 is an example of a storing process. The CPU 511 stores the version information obtained in S34 in the version information storage area 114 of the mobile app 10 by overwriting.

Thereafter, the CPU 511 displays a transfer requesting screen (S38). For example, as shown in FIG. 6, the CPU 511 synthesizes an update instruction button 241 to input the transfer instruction with the main screen 24 and display the same on the operation panel 54. Thereafter, the CPU 511 proceeds to S11 (FIG. 8B).

When it is determined that the version information obtained in S34 coincides with the version information stored in the version information storage area 114 of the mobile app 10 (S35: YES), the CPU 511 determines whether the URL information for the setting file 32 has been updated (S39). That is, the CPU 511 determines whether the set URL has been stored in the URL information storage area 11 of the mobile app 10 in S32.

When the set URL has been stored in the URL information storage area 111 of the mobile app 10 in S32, the CPU 511 determines that the URL information for the set file has been updated (S39: YES) and proceeds to S36. That is, when new URL information has been written in the URL information of the URL information storage area 111, it is likely that the administrator has added new image files X. Therefore, the CPU 511 connects the shared folder 31 indicated by the URL information and downloads the image files X.

When S32 is not executed (i.e., when the set URL information is not stored in the URL information storage area 111 of the mobile app 10), the CPU 511 determines that the URL information for the setting file has not been updated (S39: NO), and displays a transfer unnecessary notifying screen (S40). A process of S40 is an example of a notifying process. That is, a condition where the version information stored in the version information storage area 114 of the mobile app 10 and the URL information stored in the URL information storage area 111 are the same as those at the previous startup means that the image files X stored in the shared folder 31 indicated by the URL information are the same as those stored in the storage folder 12 at the previous startup. Therefore, for example, the CPU 511 displays a message indicating that "the designated image files had already been downloaded, and will not be download this time" on the operation panel 54. It is noted that the transfer unnecessary notification may be output from the speaker 55 as audio output. According to the above configuration, since the user can confirm non-necessity of downloading the image files X which had already been downloaded or non-necessity of transferring the same to the mobile printer, unnecessary operations to download the image files X and/or transmitting data of the image files X to the mobile printer 6 can be omitted.

After displaying the transfer unnecessary notification screen, the CPU 511 proceeds to S11 (FIG. 8B) without downloading the image files X, storing the version information in the mobile app 10f or displaying the update instruction button 241 on the main screen 24. That is, when the image files X stored in the cloud server 2 and the image files X having been downloaded in the non-volatile memory 514 are the same, the CPU 511 skips a process of S36-S38 to cancel downloading the image files X, thereby reducing process loads.

As described above, when the URL information 212a is delivered with use of the query 212, the mobile app 10 according to the illustrative embodiment can access the cloud server 2 indicated by the URL information, without awaiting the user's input of the URL information, and start downloading the image files X from the cloud server 2. That is, the user can omit inputting of the URL information. Further, since the mobile app 10 stores the URL information 212a included in the query 212 in the non-volatile memory 514, the CPU 511 can refer to the URL information 212a stored in the non-volatile memory 514 at a next operation. Therefore, the CPU 511 can start downloading the image files X from the cloud server 2 without awaiting the user's input of the URL information. That is, it is possible to omit the process of the user's input of the URL information.

It is noted that aspects of the present disclosures need not be limited to the configuration of the illustrative embodiment, but the above-described configuration can be improved or modified in various ways within aspects of the present disclosures.

In the SP 5, there could be a case where the mobile app 10 may not be started up even if the URL scheme 211 displayed on the operation panel 54 is tapped since the command 213 may not be delivered from the mailer 14 to the OS 15, depending on a type of the mailer 14. That is, depending on the type of the app, there could be a case where the URL scheme 211 is not recognized. In such a case, the worker may copy the URL information 212a (see FIG. 7) embedded in the e-mail and paste the same in the URL input field 222a of the interface 222 (see FIG. 4). Thus, even when the mailer 14 does not recognize the URL scheme 211, it is not necessary for the worker to input all the characters in the URL information 212a manually in the URL input field 222a, and a troublesome operation is not required. It is noted that, as described above, by employing a configuration in which the query 212 including the URL information 212a is delivered from the OS 15 to the mobile app 10 at the time of startup of the URL scheme 211, and by making use of the URL scheme 211, the user can start the mobile app 10 simply by tapping the text describing the URL information.

In the above-described embodiment, the query 212 including the URL information 212a is embedded in the e-mail, which is delivered from the mailer 14 to the mobile app 10 via the OS 15. Optionally or alternatively, the URL scheme 211 including the URL information 212a may be embedded in a webpage which can be displayed by a browser 13, and the URL information 212a may be delivered from the browser 13 to the mobile app 10 via the OS 15.

The above-described illustrative embodiment may be modified such that S6 and S13 (FIG. 8B) are omitted so that the device information is not stored in the mobile app 10, and the device selection screen 23 as shown in FIG. 5 is displayed every time to encourage the user to select the device. It is noted, however, that, by making the CPU 511 execute the processes of S6 and S13, not only the user operation to input the URL information through the interface 222 of the initial screen 22 shown in FIG. 4, but also the user operation to select a device through the device selection screen 23 shown in FIG. 5 can be omitted.

The above-described illustrative embodiment may be modified such that S20 and S13 (FIGS. 8A and 8B) are omitted and the query 212 does not include the device information. In such a case, when the image files X are to be downloaded with use of the URL information 212a of the query 212, the CPU 511 encourages the user to select a device by displaying the device selection screen 23 as shown in FIG. 5. It is noted, however, that, by making the CPU 511 execute the S20 and S13 so that the query 212 includes the device information, a situation where the CPU 511 displays the device selection 23 as shown in FIG. 5 on the operation panel 54 and awaits a user operation to select a device does not occur. Further, by making the mobile app 10 to hold the device information included in the query 212, it becomes possible that the CPU 511 uses the device information held by the mobile app 10 at the next operation. Thus, at the next operation, downloading of the image files X can be started without awaiting the selection of the device. That is, the user operation to select a device can be omitted.

The illustrative embodiment may be modified such that the CPU 511 does not execute processes of S16-S19 (FIG. 8A). For example, the CPU 511 may start downloading immediately when the mobile app 10 receives the query 212, without determining appropriateness of the query 212. Further, the CPU 511 may not execute processes of S17 and S19 (FIG. 8A). For example, the CPU 511 may be configured to notify only an occurrence of an error and not to notify a content of an error. It is noted, however, the user can easily deal with the error when the CPU 511 examines the appropriateness of the URL information 212a included in the query 212 or a communication status with respect to the cloud server 2, and notifies respective errors in a distinguished manner.

The illustrative embodiment may be modified such that the setting file 32 stores identifying information of the image files X and downloading is performed for each of the image files X. it is noted that, as in the illustrative embodiment, by downloading the image files X on a folder basis, a plurality of image files X can be downloaded at a time. That is, user operation to designated the multiple image files X one by one for downloading can be omitted when the downloading is performed on the folder basis.

The illustrative embodiment may be modified such that the processes of S35, S39 and S40 (FIG. 9) are omitted, and downloading is executed without examining whether the image files X are updated or not. It is noted, however, that when the CPU 511 executes S35, S39 and S40, overlapped execution of the downloading processes can be avoided, thereby load to the CPU 511 can be reduced. Further, by notifying the transfer unnecessary notification, the user operation to download the files can be omitted.

In S35 (FIG. 9), it is determined whether the obtained version information coincides with the version information held by mobile app 10. The configuration may be modified such that the CPU 511 determines whether the version information of the setting file 32 is new or old. Then, when the version information of the setting file 32 is new, the CPU 511 downloads the image files X, while the CPU 511 does not download the image files X when the version information of the setting file 32 is old. According to such a modification, not only redundant downloading of the image files X can be avoided, but also downloading of old version of image files X can be avoided, thereby load to the CPU 511 can be reduced.

The illustrative embodiment may be modified such that the URL scheme 322 may be configured to obtain different pieces of data from different models of devices. For example, when the SP 5 connects to the cloud server with use of the URL scheme 211, a device which is communicatable using the second communication I/F 53 is selected, and the content data of the model of the selected device may be downloaded from the cloud server 2.

The URL scheme 211 is configured such that the URL information of the cloud server 2 and the device identifying information identifying the device may be included in the query 212. The device identifying information may include model information indicative of a model of the device. In such a case, when the SP 5 accesses the cloud server 2 with use of the URL scheme 211, the SP 5 may download the content data corresponding to the device identifying information from the cloud server 2. Then, the SP 5 may search for devices corresponding to the device identifying information with use of the second communication I/F 53. For example, the SP 5 may search for devices indicated by the model information. The downloaded content may be transmitted to a selected device which is a device selected from among the searched devices. The device identifying information may be information identifying an individual device such as a serial number of the device.

The cloud server 2 may be replaced with a file server which is used offline. In such a case, the URL information of the file server may be used instead of the URL information of the cloud server 2.

The cloud server 2 may store multiple image files X with assigning common identifying information to the multiple image files X, but not in the shared folder 31. In such a configuration, the identifying information may be stored in the setting file 32 instead of the URL information of the shared folder 31. The mobile app 10 may download the multiple image files X to which the identifying information, which is stored in the setting file 32, is assigned.

The illustrative embodiment may be modified such that, in S17, when the worker taps the information icon 243 on the main screen 24 (see FIG. 6), the CPU 511 may display a message indicating a cause of the error and a coping method therefor (e.g., "Format of URL information is incorrect. Please contact the administrator.") on the operation panel 54. It is noted that the process of S17 may output an audio message from the speaker 55.

The URL scheme 211 in FIG. 7 may be changed to "mobile#app://?url=http://123.456.78.9/file.json". In this case, "mobile#app://" is a command instructing startup of the mobile app 10.

An example of the memory may be a computer-readable storage medium. The computer-readable storage medium is a non-transitory medium. Other examples of the non-transitory storage medium include a recording medium such as a CD-ROM, a DVD-ROM and the like. Further, the non-transitory medium is also a tangible medium. In contrast, an electrical signal carrying a program which is downloaded from the cloud server 2 and the like is a computer-readable signal medium, which is a kind of computer-readable medium, but not included in the non-transitory computer-readable storage medium.

It is noted that the processes disclosed for the illustrative embodiment may be executed by hardware such as a single CPU, a plurality of CPU's or an ASI, or a combination thereof. Further, the processes disclosed for the illustrative embodiment may be realized in various modes such as a recording medium storing programs thereof, a method or the like.

What is claimed is:

1. A non-transitory computer-readable recording medium for an information processing device provided with a first communication interface, a second communication interface and a controller, the recording medium containing instructions realizing an application program, the instructions causing, when executed, the controller to perform:

a first communication process of downloading content data from a storage server through the first communication interface;

a second communication process of transmitting the content data downloaded in the first communication process to a target device capable of outputting the content data through the second communication interface;

a first determining process of determining whether a startup option including address information is delivered when the application program is started; and in response to determining, in the first determining process, that the startup option including the address information is delivered, a second determining process of determining whether the address information included in the startup option is address information indicating the storage server, the instructions further causing, when executed, the controller to:

in response to determining, in the second determining process, that the address information included in the startup option is the address information indicating the storage server:

download, in the first communication process, the content data from the storage server indicated by the address information included in the startup option; and     transmit, in the second communication process, the content data downloaded in the first communication process, to the target device.

2. The non-transitory computer-readable recording medium according to claim 1, wherein, when the application program is started by an operating system in which a URL indicating the application program and a text-format startup option included in the URL is delivered from the operating system to the application program, the instructions, when executed, cause the controller to determine, in the first determining process, whether the address information is included in the text-format startup option delivered from the operating system.

3. The non-transitory computer-readable recording medium according to claim 1, wherein, when it is determined, in the first determining process, that the startup option including the address information is delivered at the time of startup of the application program, the instructions, when executed, cause the controller to perform a third determining process of determining whether the address information included in the startup option has a URL format, wherein, when it is determined, in the third determining process, that the address information included in the startup option is of the URL format, the instructions cause the controller to determine, in the first determining process, that the startup option including the address information has been delivered, wherein, when it is determined, in the third determining process, that the address information included in the startup option is not of the URL format, the instructions cause the controller to perform a first error notification indicating that the address information cannot be obtained, and wherein, when communication with the storage server fails in the first communication process, the instructions, when executed, cause the controller to perform a second error notification indicating that failure of communication with the storage server.

4. A non-transitory computer-readable recording medium for an information processing device provided with a first communication interface, a second communication interface and a controller, the recording medium containing instructions realizing an application program, the instructions causing, when executed, the controller to perform:

a first communication process of downloading content data from a storage server through the first communication interface;

a second communication process of transmitting the content data downloaded in the first communication process to a target device capable of outputting the content data through the second communication interface;

a first determining process of determining whether a startup option including address information is delivered when the application program is started; and     a second determining process of determining whether the address information included in the startup option is address information indicating the storage server, the instructions further causing, when executed, the controller to:

in response to determining, in the first determining process, that the startup option including the address information is delivered and in response to determining, in the second determining process, that the address information included in the startup option is the address information indicating the storage server:

download, in the first communication process, the content data from the storage server indicated by the address information included in the startup option; and         transmit, in the second communication process, the content data downloaded in the first communication process, to the target device.

\* \* \* \* \*